Oct. 10, 1961 E. H. LAND ET AL 3,003,871

PHOTOGRAPHIC APPARATUS AND PROCESS FOR TREATING
LIGHT-SENSITVE MATERIAL
Filed Sept. 29, 1955

Edwin H. Land
Murry N. Fairbank
and
William J. McCune, Jr.
INVENTORS
BY
Brown and Mikulka
and
Robert E. Corb
ATTORNEYS United States Patent Office 3,003,871

Patented Oct. 10, 1961

3,003,871
PHOTOGRAPHIC APPARATUS AND PROCESS FOR TREATING LIGHT-SENSITIVE MATERIAL

Edwin H. Land, Cambridge, Murry N. Fairbank, Belmont, and William J. McCune, Jr., Lincoln, Mass., assignors to Polaroid Corporation, Cambridge, Mass., a corporation of Delaware

Filed Sept. 29, 1955, Ser. No. 537,464
11 Claims. (Cl. 96—29)

This invention relates to photography and more particularly to novel methods of an apparatus for treating photographic sheet materials.

Methods and apparatus have been proposed for exposing a plurality of successive frames of a strip of photosensitive sheet material and predeterminedly treating the exposed frames by superposing them with areas of another strip and with a liquid composition so distributed between said strips as to effect said treatment. This treatment requires a predetermined period during which the strips must be maintained in superposed relation and at the end of this period the strips are separated from one another. The exposure of a plurality of successive frames of a photosensitive strip and the treatment of the exposed strip within a single apparatus such as a camera presents several related problems which have been solved in one of two general ways. In one method the photosensitive strip is exposed and superposed with another strip with a processing composition therebetween as the strips are moved through apparatus such as a camera, and after remaining in superposed relation for a predetermined processing period, the moving strips are separated from one another. It is desirable to prevent variation in curvature of the superposed strips since it may result in relative movement of the strips and disturbance of the processing, so that the number of successive exposed frames which can be processed at the same time may be a function of the practical limits of camera size and space available therein for advancing the superposed strips along a path having a substantially constant curvature. The frequency at which exposures can be made is therefore limited by the number of exposed frames which can be accommodated during processing and the time required for processing each frame. Another method includes the superposition of each exposed frame of a photosensitive strip with an area of another strip and with a processing composition therebetween, and the severance of portions of the two strips containing the superposed frame and area from the remaining portions of the strips at the commencement of the processing period. While, in this method, the frequency of exposure is independent of processing since the portion of the strip being processed is severed from the portion being exposed, the severance of the photosensitive and other strips presents certain problems of handling and separating the severed strips and precludes the production of a plurality of processed frames in a single continuous strip.

Accordingly it is an object of the present invention to provide novel methods of and apparatus for successively exposing and thereafter treating a continuous strip of photosensitive sheet material, the frequency and duration of exposure being independent of the treatment of said strips.

Another object of the present invention is to provide novel methods of treating a succession of exposed frames of a strip of photosensitive sheet material by superposing said strip with another strip with a layer of processing liquid therebetween, maintaining said strips in superposed relation and substantially stationary with respect to one another during a predetermined processing period, and thereafter separating said strips and preserving them in a continuous condition.

A further object of the present invention is to provide apparatus of the above type including means defining a chamber within which a strip of photosensitive sheet material is positioned during processing, the girth of said chamber being less than the length of said strip.

Other objects of the invention will in part be obvious and will in part appear hereinafter.

The invention accordingly comprises the process involving the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
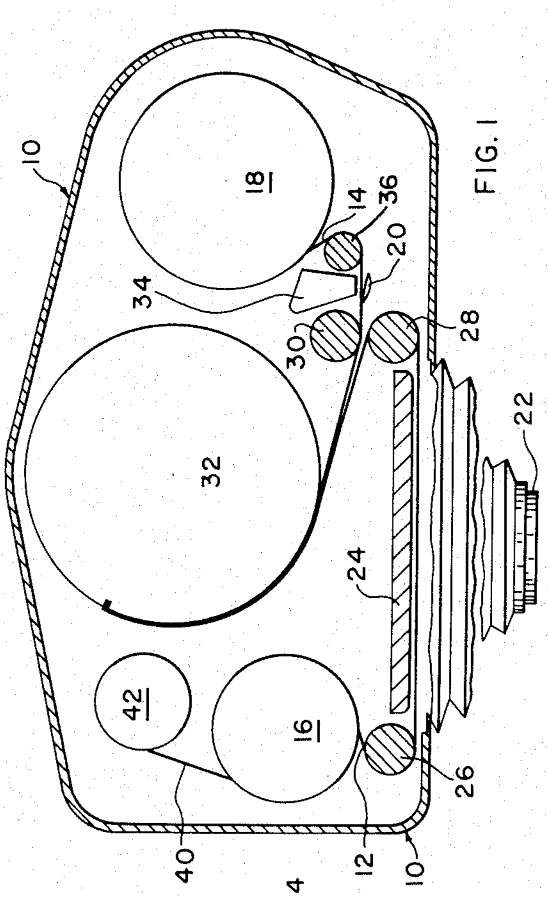
FIGURE 1 is a diagrammatic sectional view of typical apparatus constructed in accordance with the invention and capable of performing the method thereof.

Photographic processes and apparatus of the type herein disclosed generally include the steps of and means for processing an exposed photosensitive strip by superposing said photosensitive strip on another strip and spreading a thin layer of processing composition between said strips. The photosensitive strip includes a layer of photosensitive material, preferably an emulsion of silver halide, in which a latent image may be attained by differential exposure to actinic light. The other strip may merely aid in the distribution of the processing liquid, but is preferably adapted to serve as a support for an image-receptive layer in which a visible print of a latent image in the photosensitive layer may be produced. The processing composition, when spread in a uniformly thin layer between the photosensitive and other strips, preferably effectuates a silver halide diffusion transfer-reversal process by which a latent image in the photosensitive strip is developed and a positive print is produced in the other strip. The processing composition, for example, may contain an aqueous solution of a silver halide developer such as hydroquinone, a silver halide solvent such as sodium thiosulfate and an alkali such as sodium hydroxide. In this processing the photosensitive and other strips are maintained in superposed relation with the layer of processing composition interposed between them for a predetermined processing period, during which the exposed silver halide of the photosensitive strip is reduced to silver and unreduced silver halide of the photosensitive strip forms a water-soluble complex silver salt which diffuses through the layer of composition to the other strip where, upon being reduced to silver, it forms a visible print. Examples of photographic materials useful in processes of the foregoing type are described in detail in Patent No. 2,543,181, issued to Edwin H. Land on February 27, 1951. It is, of course, to be understood that the processes and apparatus herein described are not limited to use with any particular species of photosensitive or other strips, the terms "photosensitive" and "other" being used in their broadest sense to indicate a first strip which is photosensitive and another strip which may merely aid in spreading the processing composition over the surface of the photosensitive strip and which may, if desired, possess other characteristics.

The minimum period during which the two strips must remain in superposed relation with a layer of processing liquid therebetween may vary greatly, depending on the nature of the specific materials being employed and their temperature during processing and may vary, for example, from several seconds to several minutes. At the end of this minimum period, the two strips may be maintained in superposed relation without substantial adverse effect during an additional period, also dependent on the nature and temperature of the materials, and which may vary from several seconds to several hours. This additional period, when added to the minimum processing period, defines the upper limit of the allowable processing period or the maximum time the photosensitive strip or a frame thereof may be permitted to remain in superposed relation with the other strip with a layer of processing liquid therebetween. In the present invention the entire length of exposed photosensitive strip starting at one end is superposed with the other strip with the processing liquid distributed between the strips, and the strips are maintained in superposed relation until the last frame of the photosensitive strip to be superposed has remained in superposition for at least the minimum processing period. After this, the two strips are separated commencing with the last frame to be superposed and this separation progresses at such a rate that the portions of the two strips including the first frame to be superposed are separated within the maximum allowable processing period.

Reference is now made to FIG. 1 of the drawings wherein there is illustrated one form of photographic apparatus embodying the present invention and for practicing the method thereof. The herein disclosed apparatus is in the nature of an automatic camera for exposing and processing successive frames of a strip of photosensitive sheet material. While the apparatus is illustrated as a camera for both exposing and processing successive frames of a comparatively elongated photosensitive strip, the present invention also may be adapted for the treatment of strips of photosensitive sheet material which have been exposed in apparatus separate from that employed for treating the strip.

As a means for supporting and enclosing the various components of the camera, there is provided a lighttight housing generally designated at 10. Within housing 10 is mounted a supply of a photosensitive strip 12 and preferably comprising a suitable base and a suitable photosensitive layer on one side of the base. The photosensitive layer, for example, may be composed of a silver halide emulsion and is provided with a succession of frames which are adapted to receive a series of latent images upon exposure. A supply of a second strip, designated 14, is mounted within housing 10 and preferably comprises a base and a suitable image-receiving layer on one side of the base. The image-receiving layer, for example, may comprise one of the compositions now well known in the art which adapt it to receive, in successive image-receiving areas thereof, positive prints of the latent images in frames of photosensitive strip 12. Strip 12 is preferably coiled on a spool 16 of conventional design located within the housing adjacent one end thereof and strip 14 is preferably coiled on a somewhat larger supply spool 18 of conventional design pivotally mounted adjacent the other end of said housing. Spool 18 is somewhat larger than spool 16 in order to accommodate the greater cross-sectional bulk of strip 14, due in large measure to a succession of containers 20 provided for carrying a liquid processing composition. As shown, containers 20 are affixed to strip 14 at substantially regularly spaced intervals from a location adjacent its leading end toward its trailing end, the containers being so spaced that one container is associated with one image-receiving area. Each container is provided with a rupturable mouth facing the trailing end of strip 14, this mouth being adapted to eject processing composition when opposed compressional forces are applied to the container.

A conventional lens and shutter assembly, designated at 22, is mounted on a lower wall of housing 10 in position to direct light through an aperture in the lower wall of the housing. As a means for positioning successive frames of strip 12 for exposure to actinic light from the lens of assembly 22, there is provided such means as a guide plate 24 positioned between spools 16 and 18 and with its lower surface substantially at the focal surface of the lens. Successive frames of strip 12 are advanced in contact with the lower surface of plate 24 and are thereby positioned for exposure. A guide roll 26 is provided adjacent one end of plate 24 to aid in the positioning of the photosensitive strip on said plate and suitable means (not shown) may be provided for holding each frame of strip 12 in contact with the lower surface of plate 24 during exposure of the frames.

As a means for superposing successive frames of strip 12 with areas of strip 14 and distributing a processing liquid therebetween, there are provided a pair of pressure-applying rolls 28 and 30 mounted adjacent one end of plate 24 and with their axes in parallel relation. Rolls 28 and 30 are resiliently urged toward one another so that advancement, between the rolls, of a frame of strip 12 with an associated image-receiving area of strip 14 causes ejection of the processing composition from the mouth of a container 20 and spreading of the processing composition between the frame and area to form a sandwich. Within the sandwich the latent image in the frame is processed and a positive print is formed in the image-receiving area. Pressure roll 30 is mounted on means permitting roll 30 to be spaced apart from roll 28 so that the strips may be advanced between the rolls without causing distribution of the processing liquid.

The camera includes a means for storing the photosensitive and second strips in superposed relation and, in the form shown, this means comprises a storage drum 32 mounted above plate 24 between spools 16 and 18 and having a cylindrical surface around which the strips may be coiled. In practice strips 12 and 14 are provided with their leading ends joined together and preferably attached to a leader and their trailing ends attached to their respective spools. At the start of an exposure cycle of the apparatus, strip 12 is threaded from spool 16 across plate 24 and between rolls 28 and 30 where it joins the leader and strip 14, the latter extending from spool 18 between rolls 28 and 30. Drum 32 is rotated in a clockwise direction (viewing FIG. 1) so as to withdraw the strips from spools 16 and 18 and coil them in superposed relation on the drum. The apparatus includes means for rotating spools 16 and 18 so as to withdraw the strips from drum 32 and rewind them on their respective spools. Exposure of successive frames of photosensitive strip 12 is effected during this rewinding of the strips and may occur at any desirable frequency, being limited only by the rate at which the strips may be advanced.

In order that each exposed frame of photosensitive strip 12 may be processed, each frame must be so superposed with an image-receiving area of strip 14 that the container 20 associated with the image-receiving area is located adjacent the leading edge of the exposed frame in position to discharge its contents between the frame area. The frame and area of the two strips are initially located with respect to one another when the leading ends of the two strips are joined together but it is important that the frames of strip 12 be properly and accurately located on plate 24 for exposure. Accordingly, the apparatus includes control means for arresting the movement of the strips as they are being uncoiled from drum 32 and rewound on their respective spools each time a frame of strip 12 is accurately positioned for exposure on plate 24. Since the length of either of both strips may vary slightly as the result of the particular conditions of temperature and humidity occurring within the camera and because of the importance of accurately locating each exposed frame with an image-receiving area of strip 14, the control means is responsive to the movement of strip 14 for locating frames of strip 12 for exposure. By virtue of this arrangement, any error in alignment of a superposed frame and area due to variation in the length of the strips is limited to the stretch and/or shrinkage of the portions of the strips comprising that particular frame and area and is not allowed to accumulate for successive frames and areas of an elongated strip. One type of control means, shown schematically at 34, includes a lamp for directing light onto strip 14 and means such as a photoelectric cell responsive to variation in the light from the lamp reflected by strip 14 for discontinuing the rotation of spools 16 and 18 each time a frame of strip 12 is in position for exposure. To adapt it for use in the illustrated embodiment, strip 14 is provided with a series of regularly spaced index marks, configurations or apertures capable of predeterminedly modifying or varying the light from the lamp of control means 34 reflected from the strip, each index mark or configuration being associated with one image-receiving area of strip 14. The camera includes a guide roll 36 or other suitable bearing member located adjacent pressure rolls 28 and 30 and in the path of strip 14 between said rolls and spool 18 for supporting a section of strip 14 adjacent control means 34. In another form of the invention, the control means may include means adapted to be physically engaged by configurations on strip 14 and to be moved thereby for controlling the advancement of the strips through the apparatus. The apparatus also includes means for initiating the movement of the strips following exposure of a frame of strip 12.

At the start of the processing cycle, strips 12 and 14 are coiled, respectively, on spools 16 and 18 and pressure rolls 28 and 30, spaced apart during exposure, are allowed to move together into juxtaposition for applying pressure to the strips extending therebetween. Drum 32 is then rotated in a counterclockwise direction, advancing the superposed strips between rolls 28 and 30 to effect the spreading of a processing liquid from container 20 between successive superposed frames and areas and coiling the superposed strips around drum 32. Although the strips are substantially in a plane tangent to drum 32 as they are being superposed and then are curved as they are coiled around the drum, this variation in curvature of the strips occurs within a very short time after superposition of the strips and distribution of the processing liquid therebetween and consequently has no appreciable effect on the processing of the strips. It is desirable that drum 32 have the maximum diameter permitted by the limits of camera size in order to reduce the variation in curvature to a minimum. Once the superposed strips have been coiled on the drum, their curvature remains substantially constant throughout the processing period until they are separated from one another. By virtue of this arrangement, the sandwich comprising the two superposed strips with a layer of processing composition therebetween can be stored in a coil having a circumference or girth which is less than the length of the strips to be processed.

The minimum processing period is commenced with the movement of the last frame to be processed between pressure rollers 28 and 30, and when this minimum processing period has elapsed, pressure rolls 28 and 30 are again spaced apart and spools 16 and 18 are rotated so as to separate the superposed strips from one another and coil them on their respective spools. The apparatus preferably includes timing means actuated by movement of the last frame and area between rolls 28 and 30 and effective to cause the separation of rolls 28 and 30 and the rotation of spools 16 and 18 at the end of the minimum processing period. The strips are superposed and coiled on drum 32 and uncoiled and separated from one another at such a rate that the time during which the first frame and area are in superposition does not exceed the maximum allowable processing period.

The two strips and the processing liquid may be so constituted that the layer of processing liquid is caused to adhere to the photosensitive strip as the strips are separated, thereby producing a succession of finished positive prints in strip 14 which are substantially dry and ready for immediate use. It may be desirable to preserve the processed photosensitive strip for future use and, to prevent sticking or adherence of successive convolutions of strip 12 on spool 16 due to the processing liquid, there may be provided an interleaf strip 40 adapted to be coiled in superposed relation with strip 12 on spool 16. Interleaf strip 40 may be formed of any suitable sheet material, preferably paper and coated with a material such as wax, to which the processing liquid will not adhere; and additionally interleaf strip 40 may carry a composition which reacts with the residual processing liquid to aid in preserving the photosensitive strip, for example by arresting the action of the processing liquid. Interleaf strip 40 is provided initially in superposed relation with strip 12 coiled on spool 16. A storage spool 42 is provided mounted adjacent spool 16 for separating interleaf strip 40 from strip 12 and storing strip 40 as strip 12 is coiled on drum 32. Then as strip 12 is rewound on spool 16, interleaf strip 40 is unwound from storage spool 42 and is superposed with strip 12 and rewound with the latter on spool 16.

Figure 2:
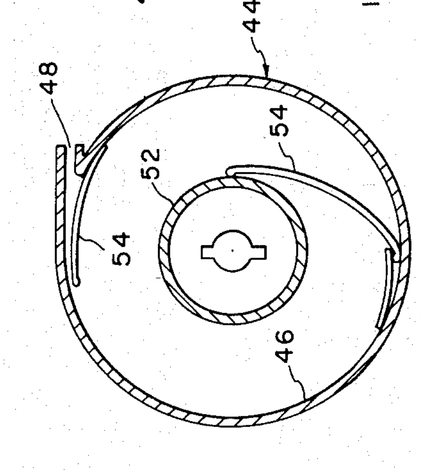
FIG. 2 is a diagrammatic sectional view of a component of the apparatus of FIG. 1.

While the photosensitive and second strips have been shown as being wound either on a spool or on a drum 32, in another embodiment of the invention they may be coiled either separately and/or in superposed relation in cylindrical containers or cassettes 44 as illustrated diagrammatically in FIG. 2. Containers 44 may be provided in place of spools 16 and 18 and drum 32 and each includes a cylindrical wall 46 having an elongated axial slot 48 through which a strip or superposed strips may be fed into and withdrawn from the container. As a means for feeding a strip into a container 44, a feed roller 52 is provided located within each container at its center and having a friction-generating surface. A guide member 54 is provided within the cassette for engaging the strips, preferably at their margins, to guide the strips into engagement with roller 52. Since it may be desirable to advance a strip 14 into a cassette 44 without applying compressive pressure to containers 20 mounted thereon, the cassette or cassettes into which strip 14 is to be coiled are provided with either a pair of feed rollers 52, located so as to engage only the margins of the strip, or a single feed roller having shoulders at its ends adapted to engage the margins of the strip. In the form shown, guide members 54 are curved to conform to cylindrical wall 46 of each cassette and each is pivotally mounted at one end on the container wall in such a manner that they may be either folded flat against wall 46 or pivoted inwardly toward the center of container 44. Spring means are provided for pivoting guide members 54 away from wall 46 toward the center of the container so that the end of each member engages feed roller 52 when the cassette is empty, or holds a strip coiled in the cassette against the feed roller. As a strip is continuously fed into container 44, the diameter of the coil increases as successive convolutions are added and the guide member 54 is gradually pivoted outwardly by the pressure of the coil toward wall 46. In this manner strips 12 and 14 can be supplied in cylindrical containers 44 rather than on spools 16 and 18 and the superposed strips can be coiled within container 44 rather than around a drum 32.

Figure 3:
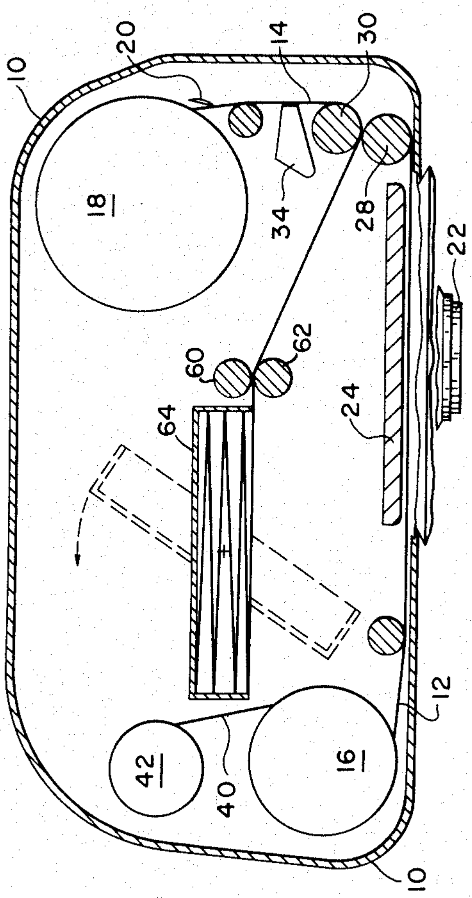
FIG. 3 is a schematic view of an alternative embodiment of the apparatus of FIG. 1 illustrating another method of the invention.

The present invention also comprehends folding the strips singly and/or in superposed relation, as illustrated diagrammatically in FIG. 3, instead of coiling the strips on spools or drums or within cassettes. A pair of feed rolls 60 and 62 are provided for advancing the sandwich comprising the superposed strips from between pressure-applying rolls 28 and 30 into a container 64 wherein portions of the sandwich, each comprising a frame, are stored in zig-zag or folded relation. Container 64 is mounted for pivotal movement about an axis intermediate its ends and generally parallel to the axes of rolls 60 and 62, and is pivotable (in a clockwise direction from the position shown) so as to effect the folding of the sandwich as it is fed into the container by rolls 60 and 62. To adapt the strips for this purpose, successive frames and areas thereof may be joined by hinge sections formed of a material more pliant than the remainder of the strips and consequently more easily folded. The superposed strips may be folded in such a manner that substantially little curvature is imparted thereto during the folding operation and the space occupied by the strips in folded condition is substantially smaller in girth than the length of the strips.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. The method of producing a succession of finished photographic images on an elongated strip of photographic sheet material from a succession of exposed frames of elongated photosensitive strip by subjecting each of said exposed frames to a treatment requiring a predetermined processing period variable within certain maximum and minimum limits, the processing period and the maximum and minimum limits thereof being the same for each frame, said method comprising the steps of: withdrawing said photosensitive strip and a second strip from, respectively, first and second storage means; as said strips are withdrawn from their repective storage means superposing said strips at a fluid distributing means and advancing said superposed strips in a first direction into a third storage means, the length of said strips advanced into said third storage means being at least approximately equal to the length of said photosensitive strip to be exposed and processed; withdrawing said superposed strips from said third storage means and during withdrawal separating said strips at said distributing means and advancing said strips in the opposite direction into their respective first and second storage means; during advancement of said photosensitive strip into said first storage means photoexposing successive frames of said photosensitive strip to produce developable latent images therein; thereafter advancing said strips in said first direction from said first and second storage means and, at said distributing means, superposing successive exposed frames of said photosensitive strip with areas of said second strip and distributing a fluid processing composition between said strips to form a sandwich at least equal in length to the length of said photosensitive strip exposed and to be processed, said fluid including an agent for reacting with said exposed photosensitive strip to produce visible images corresponding to said latent images therein; immediately as said sandwich is formed advancing said sandwich in one direction directly into said third storage means located closely adjacent said fluid distributing means, said third storage means having a maximum girth dimension which is substantially less than said length of said sandwich; advancing said sandwich into said third storage means until at least the last frame of said length of said photosensitive strip to be processed is superposed with an area of said second strip with said processing composition distributed therebetween; holding and supporting said strips comprising said sandwich in superposition and against relative movement of superposed portions of said strips in said third storage means during a time interval commencing with the superpositioning of said last frame of said photosensitive strip with an area of said second strip and at least equal to the minimum processing period; at the end of said interval withdrawing said sandwich comprising said strips in said opposite direction from said third storage means and at said distributing means seaprating said strips from one another commencing with the portion of said sandwich including said last frame; as said strips are separated from one another advancing said strips in said opposite direction into their respective first and second storage means; continuing withdrawal and separation of said strips at such a rate as to separate said first frame of said photosensitive strip from said second strip within a time interval commencing with the superpositioning of said first frame with said second strip and not exceeding the maximum limit of said processing period.

2. The method of claim 1 wherein said fluid is distributed in a layer between said photosensitive and second strips to form said sandwich; said layer of fluid is adhered to and supported on one of said strips as said strips are separated and an interleaf strip is superposed with said one strip and said layer of fluid to form another sandwich; and said other sandwich comprising said one strip, said layer of fluid and said interleaf strip is advanced into the storage means for said one strip.

3. The method of claim 1 wherein said fluid processing composition is provided in a succession of rupturable containers mounted at spaced intervals on one of said strips, each of said containers being mounted for association with a frame and area of said strips for supplying said fluid thereto; said strips are superposed with said containers located therebetween as said strips are initially withdrawn from their respective storage means; said superposed strips are initially advanced into said third storage means with said containers in an unruptured condition, whereafter said strips are withdrawn from said third storage means and said photosensitive strip is exposed; as said strips are thereafter superposed at said distributing means and advanced into said third storage means, said containers are ruptured and the fluid contents thereof are distributed between said strips to form said sandwich.

4. The method of claim 3 wherein said fluid distributing means comprise a pair of juxtaposed pressure-applying members between which said strips are advanced; said pressure-applying members are spaced apart during the initial advancement of said strips and said unruptured containers into said third storage means and subsequent withdrawal of said strips and container from said third storage means; and said pressure-applying members are moved toward one another into compressive engagement with said strips during subsequent advancement thereof between said pressure-applying members into said third storage means.

5. The method of producing a succession of finished photographic images on an elongated strip of photographic sheet material, said method comprising the steps of: withdrawing a photosensitive strip and a second strip from respectively first and second storage means; as said strips are being withdrawn from their respective storage means superposing said strips at a fluid distributing means and advancing said superposed strips in a first direction into a third storage means located closely adjacent said fluid distributing means, the length of said strips advanced into said third storage means being at least approximately equal to the length of said photosensitive strip to be exposed and processed; withdrawing said superposed strips in the opposite direction from said third storage means and, during withdrawal, separating said strips at said fluid distributing means and advancing said strips into their respective first and second storage means; during advancement of said photosensitive strip in said opposite direction into said first storage means, photoexposing successive frames of said photosensitive strip to produce developable latent images therein; thereafter continuously advancing said strips in said first direction from said first and second storage means and at said distributing means superposing successive exposed frames of said photosensitive strip with areas of said second strip and distributing a fluid processing composition between said strips to form a sandwich at least equal in length to the length of said photosensitive strip exposed and to be processed, said processing fluid including an agent for reacting with the material of said photosensitive strip for producing visible photographic images corresponding to said latent images and requiring therefor a predetermined processing period variable within certain maximum and minimum limits, said processing period and the maximum and minimum limits thereof being the same for each frame; immediately as said sandwich is formed at said distributing means, advancing said sandwich in one direction into said third storage means, the latter including means for coiling said sandwich; advancing said sandwich into a coil having a diameter which is substantially less than the length of said sandwich, and so holding said sandwich as to prevent relative movement of adjacent portions of said strips comprising said sandwich; advancing said sandwich into said third storage means until at least the last frame of said length of said photosensitive strip to be processed is superposed with an area of said second strip with said processing composition distributed therebetween; maintaining said strips comprising said sandwich in superposition and against relative movement in a coiled condition in said third storage means during a time interval commencing with the superpositioning of said last frame with said photosensitive strip with an area of said second strip and at least equal to the minimum processing period; at the end of said interval withdrawing said sandwich comprising said strips in said opposite direction from said third storage means and at said distributing means separating said strips from one another commencing with a portion of said sandwich including said last frame; as said strips are being separated from one another, advancing said strips in said opposite direction into their respective first and second storage means; continuing withdrawal and separation of said strips at such a rate as to separate said first frame of said photosensitive strip from said second strip within a time interval commencing with the superpositioning of said first frame with said second strip and not exceeding the maximum limit of said processing period.

6. The method of claim 5 wherein said fluid processing composition is provided in a succession of rupturable containers mounted at spaced intervals on one of said strips, each of said containers being mounted for association with a frame and area of said strips for supplying said fluid thereto; said strips are superposed with said containers located therebetween as said strips are initially withdrawn from their respective storage means; said superposed strips are initially advanced into said third storage means with said containers in an unruptured condition; whereafter said strips are withdrawn from said third storage means and said photosensitive strip is exposed; as said strips are thereafter superposed at said distributing means and advanced into said third storage means, said containers are ruptured and the fluid contents thereof are distributed between said strips to form said sandwich.

7. The method of claim 5 wherein said fluid distributing means comprise a pair of juxtaposed pressure-applying members between which said strips are advanced; said pressure-applying members are spaced apart during the initial advancement of said strips and said unruptured containers into said third storage means and subsequent withdrawal of said strips and container from said third storage means; and said pressure-applying members are moved toward one another into compressive engagement with said strips during subsequent advancement thereof between said pressure-applying members into said third storage means.

8. The method of claim 5 wherein said first and second storage means comprise means for coiling said first and second strips and holding said strips in a coiled condition.

9. The method of claim 8 wherein said fluid processing composition is distributed in a layer between said photosensitive and second strips to form said sandwich; as said strips are being separated, said layer of fluid is adhered to and supported on said photosensitive strip and an interleaf strip is superposed with said photosensitive strip and said layer of fluid to form another sandwich; and said other sandwich comprising said photosensitive strip, said layer of fluid, and said interleaf strip is advanced into said first storage means and is coiled therein.

10. The method of claim 9 wherein said interleaf strip is initially provided in said first storage means in superposition with said photosensitive strip; during advancement of said photosensitive strip into said third storage means, said interleaf strip is advanced into a fourth storage means from which said interleaf strip is withdrawn and superposed with said photosensitive strip during advancement of the latter into said first storage means.

11. The method of claim 9 wherein a second interleaf strip is initially provided in superposition with said second strip in said second storage means; said second interleaf strip is advanced into a fifth storage means during movement of said second strip into said third storage means; and said second interleaf strip is withdrawn from said fifth storage means and superposed with said second strip during advancement of said second strip in said opposite direction into said second storage means.

References Cited in the file of this patent

UNITED STATES PATENTS

| | | |
|---|---|---|
| 497,884 | Krause et al. | May 23, 1893 |
| 539,713 | Turner | May 21, 1895 |
| 1,303,836 | Wykoff et al. | May 13, 1919 |
| 2,520,641 | Land | Aug. 29, 1950 |
| 2,572,357 | Land | Oct. 23, 1951 |
| 2,657,618 | Eisbein | Nov. 3, 1953 |
| 2,740,717 | Yutzy et al. | Apr. 3, 1956 |
| 2,778,269 | Bartlett | Jan. 22, 1957 |
| 2,800,215 | Converse | July 23, 1957 |

FOREIGN PATENTS

| | | |
|---|---|---|
| 879,995 | France | Dec. 10, 1942 |